UNITED STATES PATENT OFFICE.

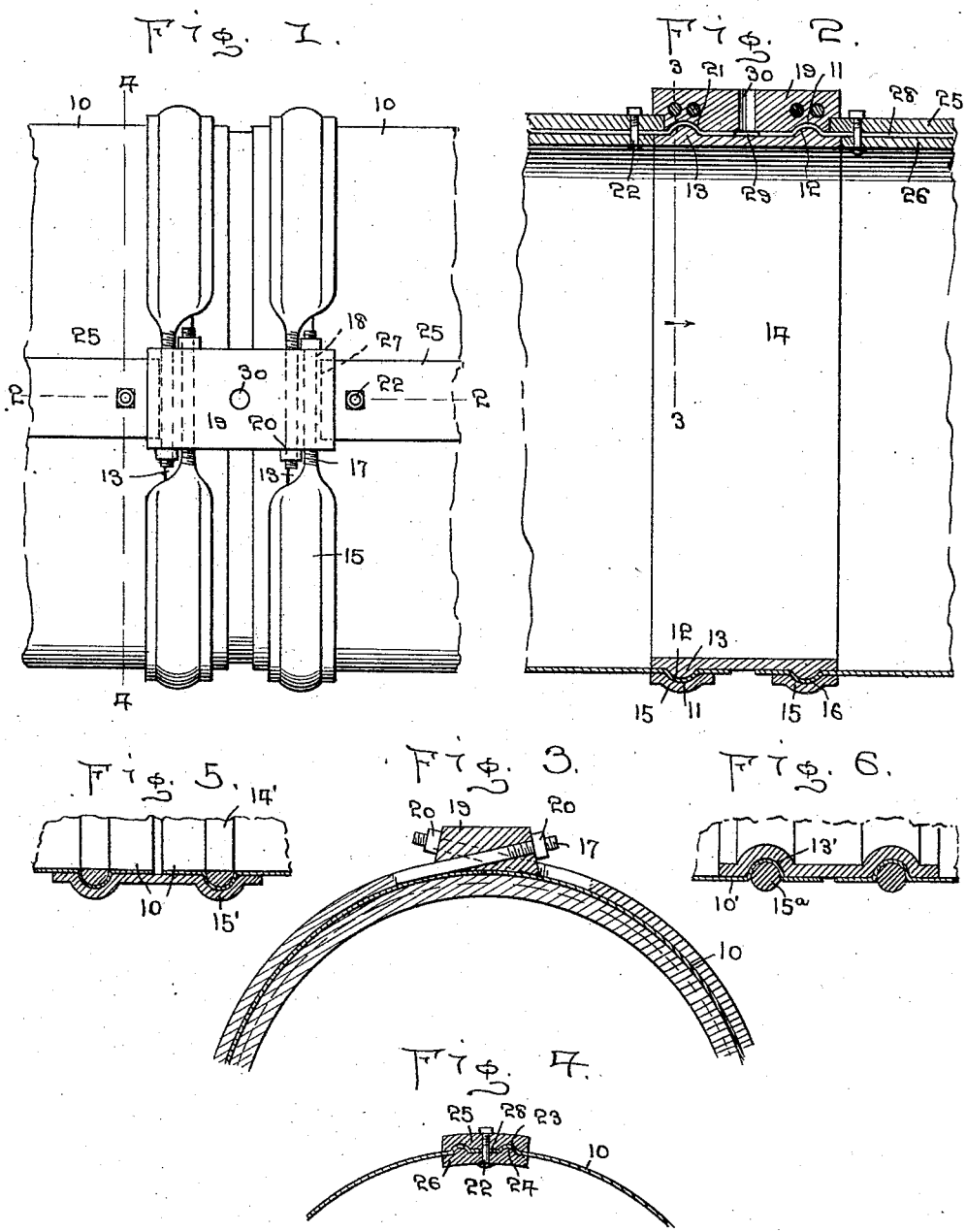

JOSEPH W. WELCH, OF OGDEN, UTAH.

PIPE CONSTRUCTION.

1,074,395.  Specification of Letters Patent.  Patented Sept. 30, 1913.

Application filed November 29, 1912. Serial No. 734,152.

*To all whom it may concern:*

Be it known that I, JOSEPH W. WELCH, a citizen of the United States, residing at Ogden, in the county of Weber and State of Utah, have invented certain new and useful Improvements in Pipe Construction; and I do hereby declare the following to be a full, clear, and exact description of the invention, such as will enable others skilled in the art to which it appertains to make and use the same.

This invention relates to pipe construction, and it relates especially to certain improvements in connection with my pending application #691,921, filed April 19, 1912.

An object of the invention is to provide certain improvements of construction that will render the pipe sections perfectly interchangeable with each other and adapted to be quickly and easily connected with the pipe sections and couplings illustrated in said pending application.

Another object of the invention is to provide a pipe section of this character, the end connections of which are interchangeable with each other.

A still further object of the invention is to provide a pipe section of this character, which may be assembled by inexperienced and inexpert workmen, without the necessity of using tools other than ordinary wrenches, and a still further object is to provide a pipe of this character, which is entirely non-leakable.

With these objects in view the invention consists in the improved construction, arrangement and combination of parts of a device of the character specified, which will be hereinafter fully described and afterward specifically claimed.

In the accompanying drawings Figure 1 is a top plan view of the adjacent ends of two pipe sections and their connections constructed in accordance with my invention. Fig. 2 is a vertical sectional view in the axial plane of the pipe sections and the connections on the line 2—2 of Fig. 1. Fig. 3 is a sectional view taken on the line 3—3 of Fig. 2. Fig. 4 is a sectional view taken on the line 4—4 of Fig. 1. Fig. 5 is a fragmental sectional view illustrating a modified form of the invention, and Fig. 6 is a fragmental sectional view of another modified form of the invention.

Referring to these drawings in which similar reference characters indicate similar parts throughout the several views, two similar counterpart pipe sections 10 are provided with beads 11 and corresponding grooves 12, and into the grooves 12 are fitted beads 13, which are formed on a clamping ring 14. A pair of outer clamping rings 15 are provided with peripheral grooves 16, which are fitted upon the beads, 11 and each ring or tightening band 15 is provided with screw bolts 17 formed on its ends, which extend through apertures 18 in a clamping head or block 19, and on opposite sides of the head 19 are nuts 20, by means of which the bands 15 may be clamped tightly in position upon the respective beads 11. The block 19 is formed with grooves 21 which fit upon the beads 11 between the ends of the grooves 16.

The adjacent edges of the respective pipe sections 10 are slightly spaced apart for the reception of clamp bolts 22 (see Fig. 4), and the adjacent edge portions of said sections are provided with beads 23 and corresponding grooves 24. A longitudinally curved clamping strip 25 fits over the beads 23, while a longitudinally beaded clamping strip 26 fits into the grooves 24; so that when the nut is tightened upon bolt 22, the clamping strips 25 and 26 coact therewith for tightly and securely clamping the adjacent edges of the pipe section 10, so as to form the same into a ring or cylinder. The head or block 19 is provided with recesses 27, into which are fitted the respective ends of the clamping strips 25.

The pipe sections 10 may be of any desired and convenient length and diameter, but the construction described is particularly applicable for pipes of large dimensions, such as flumes and conduits for mining, irrigating, dredging etc., but it is more particularly useful, convenient and economical when the circumstances are such that the pipe, flume or conduit is to be transported for a considerable distance by private conveyances, such as wagons, carts, etc., when it becomes especially desirable to nest the pipe sections, thereby reducing their bulk to the minimum. This may be done in an obvious manner before the clamping strips 25 and 26 are applied, and before the clamping bands and block 19 are applied, and it is obvious that the rings 15 can also be nested and rendered compact for shipment.

It is obvious that the several beads, grooves, and other elements of the integral members of the pipe or flume may be formed at a suitable factory, so that the necessity for subsequently machining, cutting, punching, boring or bending any of the parts is entirely eliminated, during the operation of assembling said integral members.

The pipe or flume is assembled as follows: First, the nuts 20 are unscrewed, but not removed from the bolts 17, the pipe sections 10 are then reduced in diameter, by causing their adjacent ends to lap until the beads 11 are seated in the grooves 16, and the nuts on the bolts 22 are then loosened, so that the strips 25 and 26 may be slid into place on one of the sections 10, during which operation the bolts 22 slide between the adjacent edges 28, until an end of the strip 25 is seated in one of the recesses 27; whereupon the ring 14 is seated into place, and then the other clamping strips 25 and 26 are slid into place on the other side of the ring and on the other section 10, and then the nuts 22 are tightened, for clamping these strips 25 and 26 upon the adjacent edges 28, and the nuts 20 are then tightened, for clamping the adjacent ends of the respective sections 10 upon the internal ring 14. Other sections 10 and their clamping members are attached in the same way, without the removal of any of the bolts or nuts, thereby effecting a great saving of time, and avoiding the loss or misfitting of said bolts or nuts, and at the same time allowing the pipe or flume to be assembled by entirely inexperienced persons. Owing to the spaces between the edges 28 communicating with the spaces between the adjacent ends of the pipe sections, as indicated at 29, an opening results, which would allow the pipe to leak at 29, and in order to avoid leakage at this point, I provide the block 19 with a central aperture 30, communicating with the opening 29. Through the opening 30, I may pour melted lead, sulfur, or other suitable material for closing the opening 29, having first applied clay or the like for preventing the melted material from escaping from under the block 19.

In Fig. 5 I have illustrated a modified form in which two internal rings and one external clamping ring are employed as indicated at 14′ and 15′ respectively, while in Fig. 6 is illustrated another modified form in which the internal clamping ring is provided with grooves 13′, in lieu of the beads 13 in Fig. 2. In this view, the pipe sections 10′ constitute a modified form of the pipe sections 10, while the clamp rings 15ᵃ fit into the external peripheral grooves of said pipe sections.

It is obvious that the same general principle applies in the several forms, and it is also obvious that I have provided a device of this character which is fully capable of attaining the foregoing objects, and in a thoroughly practical and efficient manner.

I do not limit my invention to the exact details of construction, combination and arrangement of parts, as herewith illustrated and described, but my invention may only be limited by a reasonable interpretation of the claims.

I claim:

1. A knock-down pipe comprising counterpart pipe sections formed from sheet metal, each section having two opposite edges brought into proximity and being slightly spaced apart, clamping strips engaging the proximate edges, clamping bolts extending through the clamping strips between the proximate edges and coacting with the strips for clamping the edges, an internal clamping ring fitted within an end of each pipe section, clamping bands fitted around the ends of the pipe sections, a clamping block, and bolts carried by the clamping bands and having nuts coacting with the clamping block for tightening the bands, said block being provided with an aperture in communication with the spaces between said proximate edges for the application of melted material for preventing leakage.

2. A knock-down pipe comprising pipe sections formed from sheet metal with two opposite and axially parallel edges brought into proximate and spaced relation and having grooves formed adjacent to and parallel with said edges, a clamping strip having longitudinally disposed beads and having apertures between the beads, a second clamping strip having grooves to coöperate with the grooves in the pipe and the beads on the first clamping strip and provided also with apertures, clamping bolts through the apertures of the clamping strip and extending between the proximate edges and adapted to be moved longitudinally of the edges while the clamping strips are slid with said beads in said groove, whereby each pipe section may be alternately built up and knocked down with the maximum ease and facility.

3. A knock-down pipe, comprising pipe sections formed from sheet metal and having their axially parallel edges clamped together in slightly spaced relation, means including a clamping block for securing the adjacent ends of the several pipe sections together in slightly spaced relation, the axially parallel edges of the pipe sections being alined and having their respective spaces in communication with the space between the ends of the pipe sections, said clamping block having an aperture extending therethrough and in communication with the communicating space between said adjacent edges and ends, adapted to receive suitable material for closing the spaces at their point of communication, so as to prevent leakage.

In testimony whereof I have signed my name to this specification in the presence of two subscribing witnesses.

JOSEPH W. WELCH.

Witnesses:
M. C. WOODS,
J. J. BRUMMITT.

Copies of this patent may be obtained for five cents each, by addressing the "Commissioner of Patents, Washington, D. C."